United States Patent

(12) United States Patent
Lin

(10) Patent No.: US 9,086,593 B2
(45) Date of Patent: Jul. 21, 2015

(54) LED UNIT AND DISPLAY INCOPORATING THE SAME

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 121 days.

(21) Appl. No.: 13/749,580

(22) Filed: Jan. 24, 2013

(65) Prior Publication Data

US 2014/0153223 A1 Jun. 5, 2014

(30) Foreign Application Priority Data

Dec. 4, 2012 (TW) .............................. 101145399 A

(51) Int. Cl.
G02F 1/1335 (2006.01)
(52) U.S. Cl.
CPC ................................ G02F 1/133603 (2013.01)
(58) Field of Classification Search
CPC .................................................. G02F 1/133603
See application file for complete search history.

(56) References Cited

U.S. PATENT DOCUMENTS

| | | | | |
|---|---|---|---|---|
| 6,724,543 B1* | 4/2004 | Chinniah et al. | ............... | 359/718 |
| 7,841,739 B2* | 11/2010 | Liu et al. | ........................ | 362/245 |
| 7,963,680 B2* | 6/2011 | Yoon et al. | .................... | 362/336 |
| 2006/0083000 A1* | 4/2006 | Yoon et al. | .................... | 362/311 |
| 2007/0091615 A1* | 4/2007 | Hsieh et al. | .................... | 362/335 |
| 2010/0142200 A1* | 6/2010 | Huang | ........................ | 362/235 |
| 2011/0116272 A1* | 5/2011 | Bak et al. | ................. | 362/296.01 |
| 2011/0122632 A1* | 5/2011 | Ku et al. | .................. | 362/311.02 |
| 2013/0229808 A1* | 9/2013 | Wang et al. | ............... | 362/311.01 |

* cited by examiner

*Primary Examiner* — Elmito Breval
(74) *Attorney, Agent, or Firm* — Novak Druce Connolly Bove + Quigg LLP

(57) ABSTRACT

An LCD module includes a screen, a light diffusion plate, a lens and an LED. The lens covers the LED. The lens includes a main body having a bottom face and a top face opposite to the bottom face. The bottom face of the main body defines a cavity to receive the LED. The top face of the main body forms a plurality of concentric annuluses thereon. Each annulus has a first face perpendicular to the top face of the main body, and a second face inclined relative to the top face of the main body, to thereby diverge a part of light from the LED and into the lens. A central area of the top face of the main body is surrounded by an innermost annulus, and forms a rough face for diffusion another part of the light from the LED into the lens.

15 Claims, 3 Drawing Sheets

LED UNIT AND DISPLAY INCOPORATING THE SAME

BACKGROUND

1. Technical Field

The disclosure generally relates to an LED (light emitting diode) unit, and more particularly, to an LED unit used in a display such as a liquid crystal display (LCD).

2. Description of Related Art

Nowadays LEDs (light emitting diodes) are applied widely in displays for illuminating the screens thereof. A type of display, generally called direct-backlight display, uses a plurality of LEDs which is located behind the screen thereof to directly illuminate the screen. In order to obtain a uniform illumination for the screen, a diffusion plate is often placed between the screen and the LEDs. However, the diffusion plate must be kept a sufficient distance from the LEDs, to thereby ensure that the light emitted from the LEDs can be evenly diffused by the diffusion plate before entering the screen. Thus, a thickness of the display cannot be thin enough. A way to resolve such problem is to provide a diffusion lens for each LED. Nevertheless, the diffusion capability of the lens is still insufficient such that some hot spots may be formed on the screen even after diffusion of the light by the diffusion lens.

What is needed, therefore, is an LED unit of a direct-backlight display which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
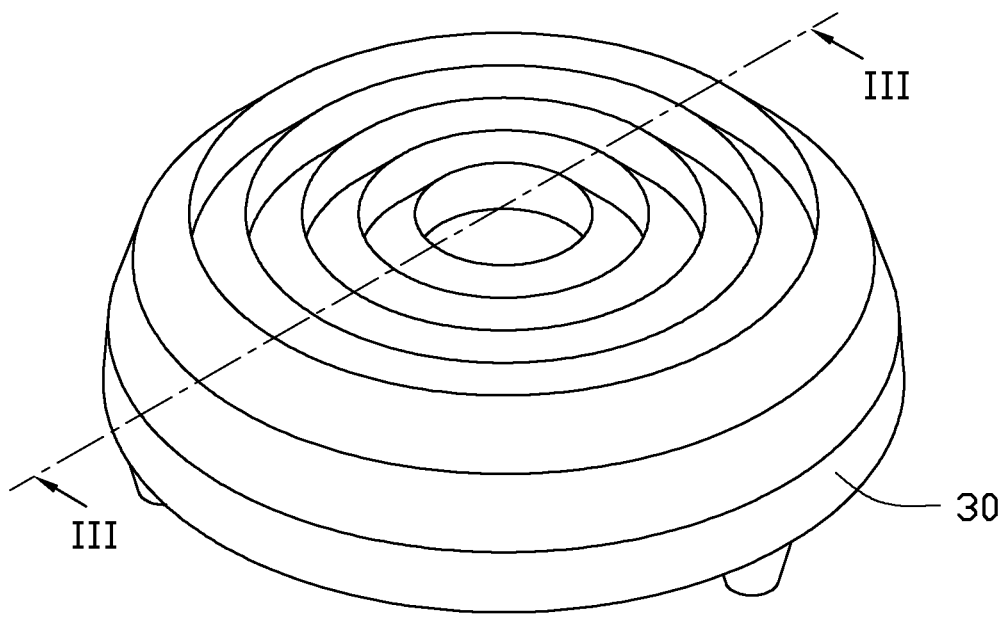
FIG. 1 is an isometric, assembled view of an LED unit in accordance with an embodiment of the present disclosure.
Figure 3:
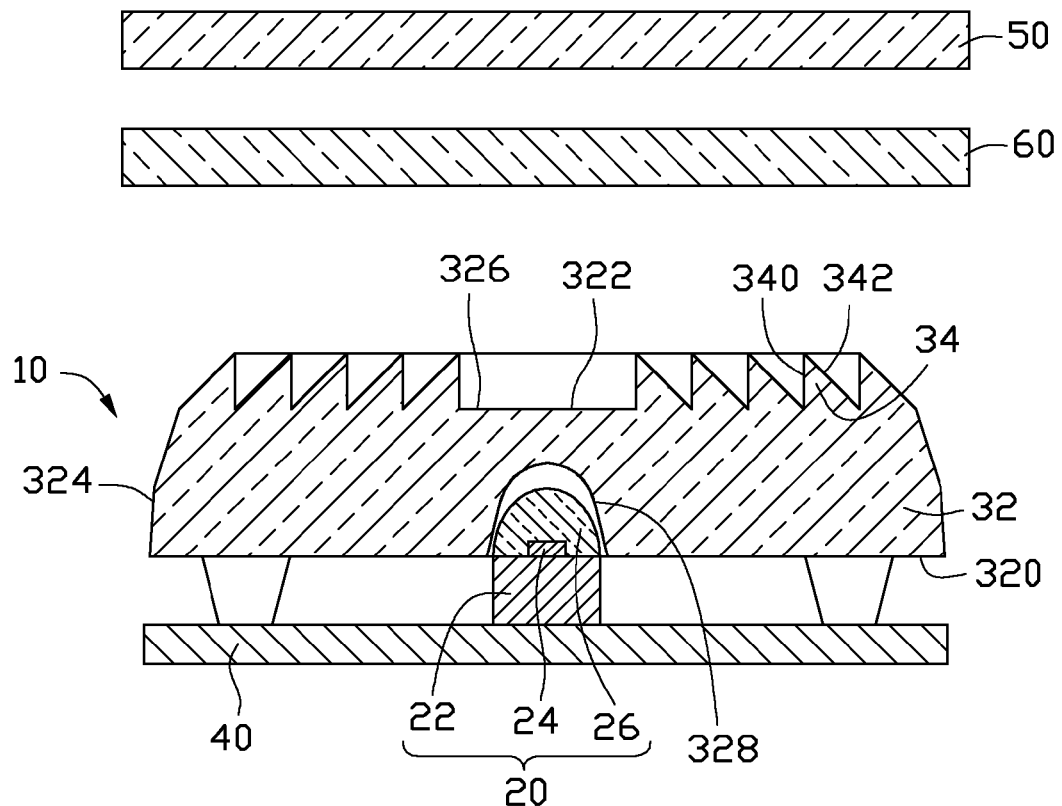
FIG. 3 is a cross section of a direct-backlight display using the LED unit of FIG. 1 taken along line thereof, wherein an LED is placed on a substrate of the LED unit.

Referring to FIGS. 1 and 3, an LED unit 10 in accordance with an embodiment of the present disclosure is shown. The LED unit 10 includes an LED 20, a substrate 40 supporting the LED 20 and a lens 30 covering the LED 20.

The LED 20 includes a base 22, a light-emitting chip 24 mounted on the base 22 and an encapsulant 26 sealing the chip 24. The base 22 may be made of electrically-insulating and heat-conductive materials such as ceramic. Two leads (not shown) may be further formed on the base 22 for introducing power to the chip 24. The chip 24 may be made of semiconductor materials such as GaN, InGaN, AlInGaN or the like. Preferably, the chip 24 emits blue light when being activated. The encapsulant 26 may be made of transparent materials such as epoxy, silicone, glass or the like. Yellow phosphors (not shown) may be further doped within the encapsulant 26 to change the blue light from the chip 24 to yellow light. Thus, the blue light mixes with the yellow light to produce white light.

The LED 20 is mounted on the substrate 40. In this embodiment, the substrate 40 is a circuit board which electrically connects the two leads of the LED 20. Thus, the power can be transferred to the LED 20 through the substrate 40.

Figure 2:
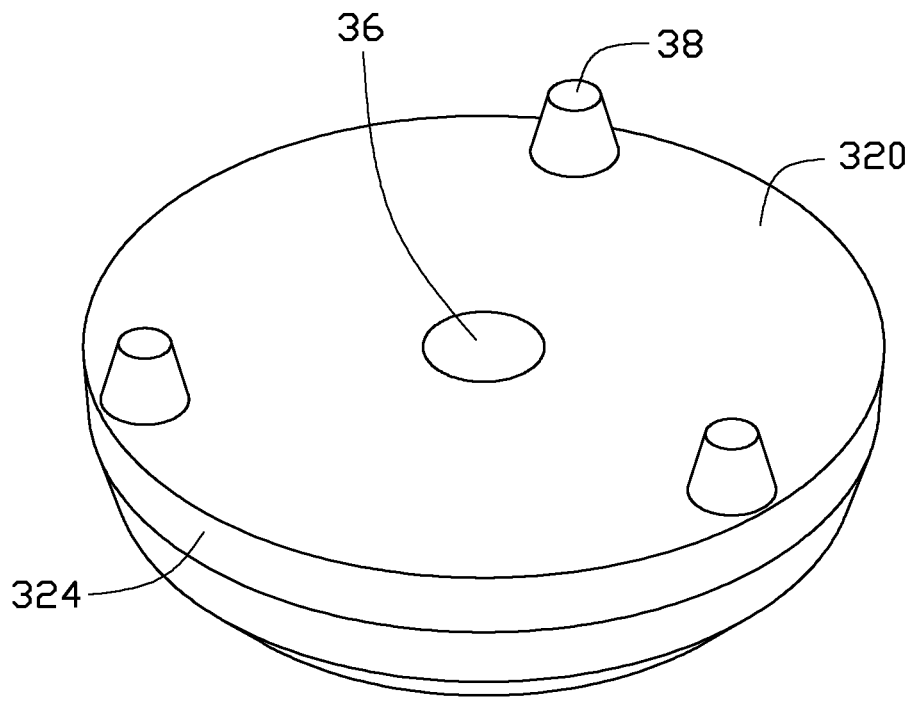
FIG. 2 is an inverted view of a lens of the LED unit of FIG. 1.

Also referring to FIG. 2, the lens 30 includes a main body 32 and a plurality of legs 38 extending downwardly from the main body 32. The lens 30 is integrally made of a monolithic piece of transparent materials such as PC (polycarbonate) or PMMA (polymethylmethacrylate). The main body 32 has a circular shape. The main body 32 includes a flat bottom face 320, a flat top face 322 parallel to the bottom face 320 and a side face 324 interconnecting the top face 322 and the bottom face 320. A cavity 36 is defined in a central area of the bottom face 320 to receive the LED 20 therein. An inner face of the main body 32 defining the cavity 36 acts as a light-incident face 328 of the lens 30.

A plurality of annuluses 34 is formed on the top face 322 of the main body 32. The annuluses 34 are concentric about a center of the top face 322 of the main body 32 such that the lens 30 has an appearance similar to a Fresnel lens. Each annulus 34 includes a first face 340 and a second face 342 connecting the first face 340. In this embodiment, the first face 340 is perpendicular to the top face 322 of the main body 32, and the second face 342 is inclined relative to the top face 322 of the main body 32. An angle defined between the first face 340 and the second face 342 of each annulus 34 is less than 90 degrees, and preferably, equal to 45 degrees. The second face 342 of each annulus 34 connects the first face 340 of an adjacent outer annulus 34 so that the annuluses 34 are sequentially connected together. A part of light emergent from the LED 20 with a large angle, enters the lens 30 through the light-incident face 328, and then refracted by the annuluses 34 to be divergent out of the lens 30. Thus, the part of light with the large emergent angle can be diffused by the annuluses 34 of the lens 30 to uniform light.

A central area of the top face 322 of the main body 32 forms a rough face 326. The rough face 326 is surrounded by an innermost annulus 34. Another part of light emergent from the LED 20 with a small angle, enters the lens 32 through the light-incident face 328, and then diffused by the rough face 326 out of the lens 30. Thus, the another part of the light with the small emergent angle is also be diffused by the rough face 326 to uniform light.

The three legs 38 extend downwardly from the bottom face 320 of the main body 32 towards the substrate 40. The three legs 38 are disposed on the substrate 40 to support the main body 32 over the LED 20.

The LED unit 10 is disposed behind a screen 50 of a display. The screen 50 is a screen for a liquid crystal display (LCD) module. In practice, there is a plurality of LED units 10 behind the screen 50, and the screen 50 has an area far larger than that of the LED unit 10. The light emitted from the LED 20 is diffused by the lens 30 to a uniform light beam on a diffusion plate 60 which further diffuses the light beam into a uniform light to uniformly illuminate the screen 50. Thus, the screen 50 can have a uniform illumination without significant hot spots appearing thereon. Since the lens 30 has sufficient light-diffusion capability, the LED 20 is not required to be placed from the light diffusion plate 60 with a large distance, whereby a thickness of the display incorporating the LED unit 10 can be controlled thin enough. In addition, the required number of the LEDs 20 of the display can be lowered thereby to reduce the cost of the display.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An LED (light emitting diode) unit for illuminating a screen of an LCD module via a diffusion plate, comprising:
    an LED; and
    a lens covering the LED, the lens comprising a main body having a flat top face configured for facing the diffusion plate and a flat bottom face facing the LED, the flat top face of the main body substantially parallel to the flat bottom face of the main body, a plurality of annuluses being formed on the flat top face of the main body, each of the plurality of annuluses having a first face substantially perpendicular to the flat top face of the main body and a second face inclined relative to the flat top face of the main body, an area of the flat top face of the main body surrounded by an innermost annulus being a rough face;
    wherein light emitted from the LED with a large emergent angle is diverged by the annuluses, and light emitted from the LED with a small emergent angle is diffused by the rough face, whereby the light emitted from the LED obtains a uniform light distribution,
    wherein the main body forms a concave light-incident face in the flat bottom face thereof, the LED surrounded by the light-incident face.

2. The LED unit of claim 1, wherein an angle defined between the first face and the second face of each annulus is less than 90 degrees.

3. The LED unit of claim 2, wherein the angle defined between the first face and the second face of each annulus is 45 degrees.

4. The LED unit of claim 1, wherein the first face of each annulus directly connects the second face of an adjacent annulus.

5. The LED unit of claim 1, wherein the rough face is located at a central area of the flat top face of the main body.

6. The LED unit of claim 1, wherein the annuluses are concentric about a center of the flat top face of the main body.

7. The LED unit of claim 1, wherein the light-incident face is aligned with the rough face.

8. The LED unit of claim 1, wherein the lens further comprises a plurality of legs extending from the flat bottom face of the main body towards the LED.

9. The LED unit of claim 1, wherein the first face of each annulus is located more adjacent to the rough face than the second face of each annulus.

10. An LCD module comprising:
    a screen;
    a diffusion plate located behind the screen;
    an LED (light emitting diode) module; and
    a lens placed between the LED module and the diffusion plate;
    wherein the lens comprising a main body having a flat top face facing the light diffusion plate and a flat bottom face facing the LED, the flat top face of the main body being parallel to the flat bottom face of the main body, a plurality of annuluses being formed on the top face of the main body, each annulus having a first face perpendicular to the flat top face of the main body and a second face inclined relative to the flat top face of the main body, an area of the flat top face of the main body surrounded by an innermost annulus being a rough face; and
    wherein light emitted from the LED is diffused by the rough face and the annuluses of the lens onto the light diffusion plate,
    wherein the main body defines a cavity in the flat bottom face thereof, an inner face of the main body defining the cavity forming a light incident face of the lens to receive the light emitted from the LED.

11. The LCD module of claim 10, wherein an angle defined between the first face and the second face of each annulus is 45 degrees.

12. The LCD module of claim 10, wherein the first face of each annulus directly connects the second face of an adjacent annulus.

13. The LCD module of claim 10, wherein the first face of each annulus is located nearer the rough face than the second face of each annulus.

14. The LCD module of claim 10, wherein the lens further comprises a plurality of legs extending downwardly from the flat bottom face of the main body towards the LED.

15. The LCD module of claim 14, wherein the LED module further comprises a substrate supporting the LED thereon, the legs of the lens being disposed on the substrate.

* * * * *